United States Patent [19]

Miyako

[11] Patent Number: 4,495,612
[45] Date of Patent: Jan. 22, 1985

[54] TONE ARM CONTROL MECHANISM

[75] Inventor: Haruyoshi Miyako, Nagano, Japan

[73] Assignee: Kabushiki Kaisha Sankyo Seiki Seisakusho, Nagano, Japan

[21] Appl. No.: 371,167

[22] Filed: Apr. 23, 1982

[30] Foreign Application Priority Data

Apr. 27, 1981 [JP] Japan .............................. 56-61132[U]
Apr. 30, 1981 [JP] Japan .............................. 56-63868[U]

[51] Int. Cl.$^3$ ........................ G11B 17/30; G11B 21/02
[52] U.S. Cl. ..................................... 369/216; 369/184; 369/244
[58] Field of Search ............... 369/216, 225, 244, 186, 369/187, 184

[56] References Cited

U.S. PATENT DOCUMENTS 2,488,260 11/1949 Ascoli .................................. 369/225
3,218,078 11/1965 Freier .................................. 369/187

Primary Examiner—Steven L. Stephan
Attorney, Agent, or Firm—Sughrue, Mion, Zinn, Macpeak and Seas

[57] ABSTRACT

A tone arm lifting and movement restricting device includes a pair of relatively rotatable and axially movable drive plates having cam and follower surfaces thereon for use in lifting and lowering the arm, while a presettable restricting lever serves to determine the extent to which the arm progresses over the record before being lowered to the surface thereof.

7 Claims, 10 Drawing Figures

TONE ARM CONTROL MECHANISM

BACKGROUND OF THE INVENTION

This invention relates to a mechanism for restricting the rotation of a tone arm and raising/lowering the tone arm by which a pickup of the tone arm can be lowered onto a desired position on a record.

When placing the pickup of a tone arm at a desired recorded portion of a record having a plurality of recorded portions on one side thereof, it is required to properly restrict the rotation of the tone arm. Conventionally, for this purpose, a servo motor is employed as a drive source for the tone arm. A photosensor detects the difference in light reflectance between the turntable and the record or a difference in reflectance between recorded and non-recorded portions and the tone arm is restricted in rotation in accordance with a detection signal of the photosensor. However, such prior mechanisms require relatively expensive parts such as servomotors and photosensors, resulting in an increased cost of manufacture. Also, in prior mechanisms, a minute difference in the level of the reflected light is detected, and the tone arm is controlled in accordance with the thus detected signal, resulting in disadvantages such that the mechanism is liable to malfunction and becomes complicated in construction.

Conventionally, there have also been known various mechanisms for raising/lowering tone arms, one of which is arranged such that a drive source for rotating the tone arm in the horizontal direction is provided separately from the drive source for moving the tone arm in the vertical direction, a motor incorporated in the drive source for vertically moving the ton arm being started upon a signal emitted when the tone arm is turned horizontally to a predetermined position, and hence a peripheral cam fitted on an output shaft of the motor is rotated to cause an arm lifter to move up and down. As an alternative, there is also known a mechanism where a single drive source is employed, and driving forces are transmitted selectively to either a means for rotating the tone arm or a means for vertically moving the same, upon the switching of a clutch, and where a solenoid is used for switching the clutch.

In either case, however, the prior art has suffered many disadvantages in that two separate drive sources are required, and it is necessary to provide mechanisms for turning and for vertical movement independently from each other. The construction becomes complicated due to the need of a switching clutch, and hence the number of parts is increased.

SUMMARY OF THE INVENTION

It is an object of this invention to overcome the above mentioned problems in the prior art and provide a mechanism for restricting the rotation of a tone arm, which operates reliably with a simple construction and without the need of relatively expensive parts.

DETAILED DESCRIPTION OF THE PREFERRED EMBODIMENTS

Figure 1:
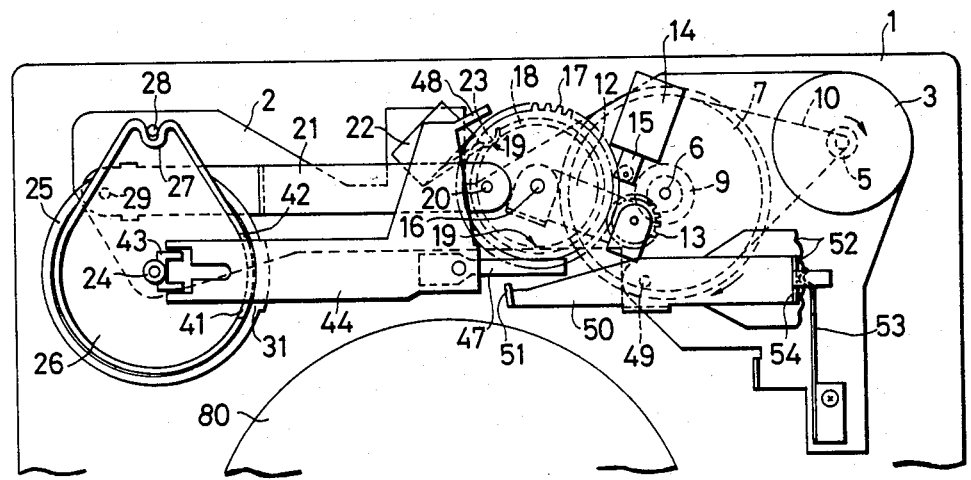
FIG. 1 is a plan view of one embodiment of the invention.
Figure 2:
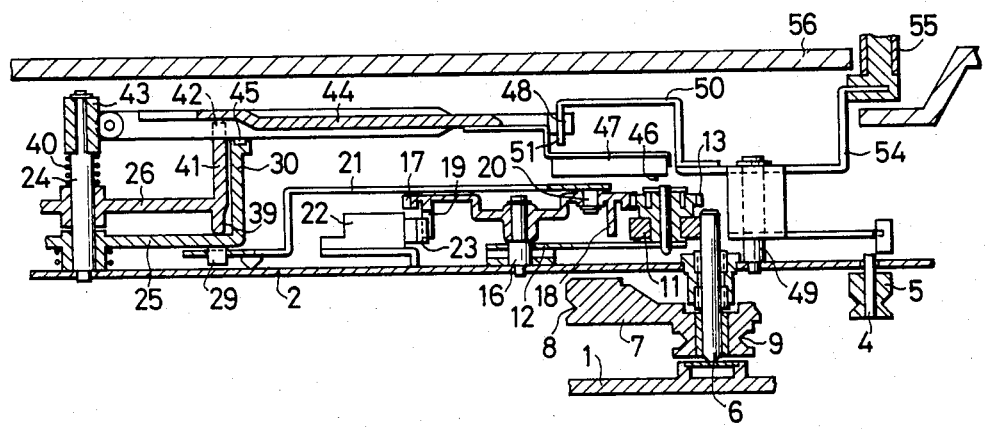
FIG. 2 is a front sectional view of the embodiment shown in FIG. 1.
Figure 3:
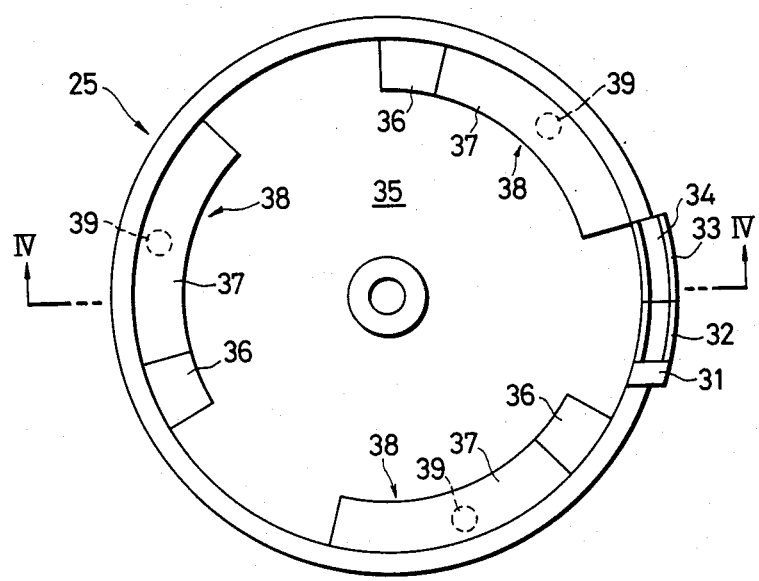
FIG. 3 is a plan view of an arm drive plate used in the embodiment of FIG. 1.
Figure 4:
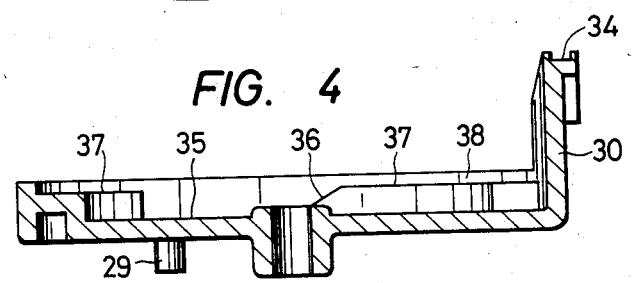
FIG. 4 is a sectional view taken along the line IV—IV in FIG. 3.
Figure 5:
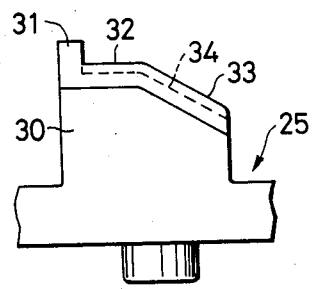
FIG. 5 is a side view showing a part of the arm drive plate of FIG. 3.
Figure 6:
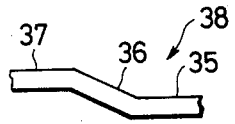
FIG. 6 is a developed view of a cam portion formed on the arm drive plate.

Referring to FIGS. 1 and 2, a base plate 2 is secured to a body case 1 along one side edge by means of posts (not shown) with an appropriate clearance therebetween. A motor 3 is secured at a rightward end portion of the base plate 2. An output shaft 4 of the motor 3 projects downwardly through the base plate 2 and and a small diameter pulley 5 is rigidly fastened to the projecting end of the shaft. Between the case 1 and the base plate 2, there is rotatably supported a flywheel 7 fitted rigidly on a capstan shaft 6. The flywheel 7 has a circumferential groove 8 at a large diameter portion thereof, and also a circumferential groove 9 at a smaller diameter portion. An endless belt 10 is trained over the pulley 5 on the motor shaft 4 and the circumferential groove 8 of the flywheel 7. Another endless belt (not shown) is entrained in the circumferential groove 9 of the flywheel 7 so as to rotate a turntable 80, on which a record is to be placed. The capstan shaft 6 has its upper end portion projecting above the base plate 2, and there is located a pinch roller 11 in the vicinity of the projecting end portion of the shaft. The pinch roller 11 is rotatably supported at the free end of a lever 12 together with a small gear 13, the lever 12 being rotatable in a plane parallel to the base plate 2. The lever 12 is coupled at one side to a plunger 15 of a solenoid 14, so that when the solenoid 14 is energized to attract the plunger 15, the lever 12 rotates about a shaft 16 in the counterclockwise direction in FIG. 1 and hence the pinch roller 11 is brought into pressure contact with the capstan shaft 6. When the excitation of the solenoid 14 stops, the plunger 15 is thrust out by a spring so as to cause the lever 12 to turn in the clockwise direction and hence disengage the pinch roller 11 from the capstan shaft 6.

A large diameter gear 17 is rotatably mounted on the support shaft 16 of the lever 12 and is always in mesh with the small gear 13. The large diameter gear 17 is integrally formed at the underside thereof with a cylindrical portion 18 which includes two recessed portions 19, 19 at opposite positions. A pin 20 is secured vertically at a position away from the center of the gear 17, and one end of a rod 21 is pivotally connected to the pin 20. A microswitch 22 is attached on the base plate 2 by the side of the gear 17. In the normal state, the free end of an actuator 23 of the microswitch 22 falls into one of the recessed portions 19, 19 formed in the cylindrical portion of the under side of the gear 17.

Figure 7:
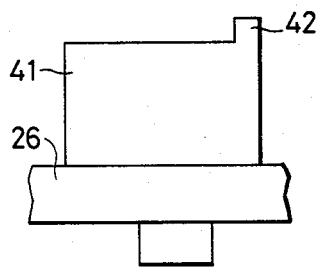
FIG. 7 is a side view showing a part of an auxiliary drive plate used in the embodiment of FIG. 1.

In FIG. 1, a shaft 24 is vertically secured at a leftward end portion of the base plate 2 and includes an arm drive plate 25 and an auxiliary drive plate 26 fitted thereon in due order. The auxiliary drive plate 26 is unable to rotate due to a recessed portion 27 formed in a projecting edge thereof being engaged with a guide shaft 28 attached vertically to the base plate 2, but is however enabled to move in the vertical direction along the shafts 24, 28. Meanwhile, the arm drive plate 25 is rotatable about the shaft 24. The arm drive plate 25 is integrally formed at its underside with a projection 29, to which the other end of the rod 21 is pivotally connected. As clearly shown in FIGS. 3 to 5, the arm drive plate 25 has a raised portion 30 serving as a portion for abutting a tone arm at a part of the peripheral edge thereof, the raised portion 30 including a protrusion 31 at the upper end thereof on one side. The arm drive plate 25 also has a flat portion 32 formed continuously from a lower portion of the protrusion 31 and an inclined portion 33 continuous with the flat portion 32. The flat portion 32 and the inclined portion 33 are formed with a groove 34, in which a friction member 45 such as a rubber member is fitted. As illustrated in FIGS. 3 to 6, the upper surface of the arm drive plate 25 includes a main surface 35 and three cam portions 38 spaced from one another at equal angular intervals, each cam portion comprising an inclined surface 36 formed continuously with the main surface 35 and an upper flat surface 37 formed continuously with the inclined surface 36. A projection 39 formed integrally at the underside of the auxiliary drive plate 26 rests on each cam portion 38. The auxiliary drive plate 26 is pressed downwardly by the resilient force of a coil spring 40 fitted around the shaft 24, and is moved upwardly or downwardly in accordance with whether the projection 39 rests on the upper flat surface 37 or the main surface 35 of the arm drive plate 25, upon rotation of the arm drive plate 25 relative to the plate 26. As illustrated in FIG. 7, the auxiliary drive plate 26 is formed with a raised portion 41 serving as an arm rest on a portion of the circumferential edge thereof. The raised portion 41 includes a protrusion 42 at the upper end thereof on one side.

As illustrated in FIGS. 1 and 2, a bearing member 43 is rotatably fitted at the upper end of the shaft 24 and one end of a tone arm 44 is pivotally connected to the shaft 24 through the bearing member 43, so that the tone arm 44 is rotatable in a horizontal plane. The tone arm 44 locates between the protrusion 31 of the arm drive plate 25 and the protrusion 42 of the auxiliary drive plate 26 and rests on the friction member 45 mounted on the raised portion 30 of the arm drive plate 25, in the normal state. The tone arm 44 includes at the distal end thereof an integrally formed pickup 47 equipped with a playback stylus 46 and also an engaging portion 48 located at a level different from the pickup 47. Above the base plate 2 there is also provided a restriction lever 50 which is rotatable in a plane parallel to the base plate 2 about a shaft 49 vertically attached to the base plate 2 by the side of the pinch roller 11. One end 51 of the restriction lever 50 is located within a path along which the engaging portion 48 of the tone arm 44 rotates in the horizontal direction. The other end of the restriction lever 50 is formed with a plurality of recesses 52 along a circular curve about the shaft 49 with equal distance therebetween. A click leaf spring 53 has its distal end falling into any one of these recesses 52 due to the resilient force thereof. As upstanding arm 54 is integrally formed with the restriction lever 50 and a knob 55 is rigidly attached to the upper end of the arm. The knob 55 is exposed to the outside through a window formed in an upper cover 56 which covers the body case 1, so that the rotational angle of the restriction lever 50 can be properly selected upon operation of the knob 55.

The operation of the foregoing embodiment will now be described. It is assumed that the record used in the foregoing embodiment has a special sound groove cut such that the groove spirals from the inner side to the outer side as it advances in the rotational direction.

Firstly the record is placed on the turntable 80 and then the knob 55 is operated to preset the rotational angle of the restriction lever 50. This operation of the lever 50 will determine the position at which the playback stylus 46 of the pickup 47 is lowered onto the record. Next, the solenoid 14 is energized by pressing a start button (not shown). The plunger 15 is attracted upon the excitation of the solenoid 14 and hence the lever 12 rotates in the counterclockwise direction in FIG. 1, so that the pinch roller 11 is brought into pressure contact with the capstan shaft 6. This causes a main switch (not shown) to turn ON, whereupon the rotational force of the capstan shaft 6 driven by the motor 3 is transmitted to the pinch roller 11 and the small gear 13, which are integral with each other. The torque of the small gear 13 is in turn transmitted to the large diameter gear 17. When the large diameter gear 17 is rotated even slightly, the distal end of the actuator 23 of the microswitch 22 moves out of the recessed portion 19 formed at the underside of the gear 17 and hence is pushed outwardly by the cylindrical portion 18. This causes the microswitch 22 to turn ON, so that the solenoid 14 is energized by the switch 22 in a self-holding manner and the large diameter gear 17 is continuously rotated even after the release of the start button. When the gear 17 rotates by a half turn, the distal end of the actuator 23 of the switch 22 falls into the other recessed portion 19 formed at the underside of the gear 17, and this causes the contact of the switch 22 to be opened. As a result, the excitation of the solenoid 14 is stopped and the pinch roller 11 is moved from the capstan shaft 6, so that both gears 13 and 17 stop rotating.

The half turn of the gear 17 as mentioned above allows the pin 20 to rotate also, whereupon the arm drive plate 25 is turned about the shaft 24 via the rod 21 in the clockwise direction in FIG. 1. As a result of such turning, the tone arm 44 resting on the friction member 45 under its own weight is also turned in the clockwise direction about the shaft 24, so that the pickup 47 located at the distal end of the tone arm 44 enters into the plane of the record placed on the turntable 80. The rotational angle or stroke of the arm drive plate 25 is always constant, whereas the rotational angle of the tone arm 44 is restricted because the engaging portion 48 of the tone arm 44 is brought into abutment with one end 51 of the restriction lever 50. The rotational stroke of the lever 50 can be optionally preset and hence the rotational angle of the tone arm 44 is correspondingly determined. After turning the tone arm 44 by a preset rotation angle, the arm drive plate 25 is still further turned, so that the arm 44 withdraws from the friction member 45 and is now supported by the arm rest 41 of the auxiliary drive plate 26. When the arm drive plate 25 approaches the end of its rotational stroke, the projection 39 of the auxiliary drive plate 26 slides down along the inclined surface 36 of the cam portion 38 formed on the arm drive plate 25 onto the main surface 35 of the arm drive plate 25. Thus, the auxiliary drive plate 26 descends along the shaft 24 and hence the tone arm 44 moves downwardly while rotating. Then, the playback stylus 46 descends onto a desired position of the record placed on the turntable 80 which is already driven to be rotated, thereby performing the playback of the record.

In order to stop playback of the record, the solenoid 14 is energized again by pressing a stop button (not shown). This causes the gear 17 to rotate by a half turn in the same manner as mentioned above. The stop button may also serve as the start button. Upon a half turn of the gear 17, the arm drive plate 25 is turned to the original position via the rod 21. As a result of such turning of the arm drive plate 25, the projection 39 of the auxiliary drive plate 26 is first pushed up on the inclined surface 36 of the arm drive plate 25 and then on the upper flat surface 37. At the same time, the auxiliary drive plate 26 ascends and the tone arm 44 resting on the raised arm rest 41 of the plate 26 is accordingly raised, so that the playback stylus 46 moves upwardly and departs from the record. When the arm drive plate 25 is further rotated, the friction member 45 enters under the tone arm 44, whereby the arm 44 is pushed to turn about the shaft 24 in the counterclockwise direction in FIG. 1 due to the friction therebetween. When the tone arm 44 is turned to the original position in this manner, the arm 44 strikes the protrusion 42 of the auxiliary drive plate 26 and stops its rotation. Thereafter, the friction member 45 slides under the tone arm 44 and hence the arm 44 is stopped in the slightly pushed-up state.

As is apparent from the above description, according to to this invention, there is obtained a device for restricting the rotation of a tone arm where an intermediate part of the tone arm is brought into frictional abutment with an abutting portion formed on a drive plate rotated reciprocatingly in order to turn the tone arm together with the rotation of the drive plate. A restricting portion of a restricting member is located in a path along which an engaging portion formed on the tone arm is rotated, and the restricting portion is made changeable in position, thus permitting free restriction of the rotation of the tone arm. Reliable turning restriction of the tone arm is thus attained with a simple construction and reduced cost of manufacture, and without the need of relatively expensive parts such as servo motors and photosensors.

While in the foregoing embodiment the tone arm is urged toward the auxiliary drive plate under its own weight so as to rest on the arm rest of the plate, the tone arm may be urged by resilient forces in a direction increasing stylus pressure or in the direction reducing the same for the purpose of obtaining appropriate stylus pressure. Since it is required to urge the auxiliary drive plate toward the arm drive plate so as to be in contact therewith, a spring is supplied for this purpose in the illustrated embodiment. However, the auxiliary drive plate may be so urged due to its own weight. The arm drive plate and the auxiliary drive plate may be exchanged in position, and the relationship between the cams formed on the respective plates and the projections abutting with the cams may be inverted in the vertical direction.

Figure 8:
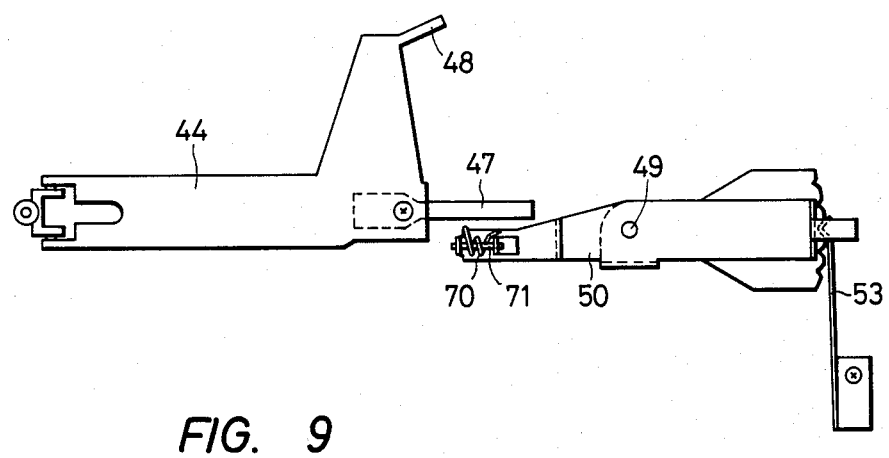
FIG. 8 is a plan view of a modified embodiment of a restricting member for use in the invention.
Figure 9:
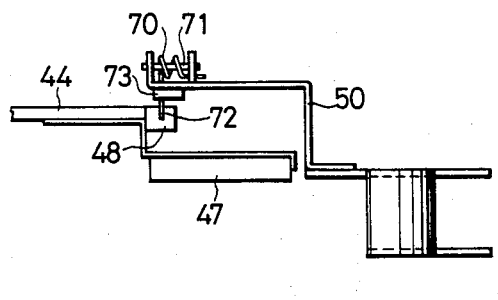
FIG. 9 is a front view showing the essential parts of the modified embodiment of FIG. 8.
Figure 10:
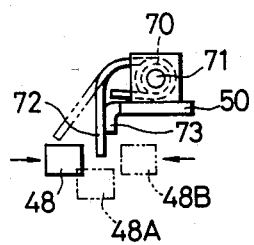
FIG. 10 is an enlarged left side view showing parts of the modified embodiment of FIG. 8.

While in the foregoing embodiment there has been used a special record having a sound groove such that the groove proceeds from the inner side to the outer side at its advances in the rotational direction, it becomes possible by a small modification in the construction of the restriction lever 50 to employ usual records having a sound groove such that the groove shifts from the outer to the inner side as it advances in the rotational direction. FIGS. 8 to 10 illustrate such a modified embodiment, in which a coil spring 70 is supported by a horizontal shaft 71 at the end of an arm of the restriction lever 50. One end 72 of the coil spring 70 is resiliently brought into pressure contact with an abutting portion 73 of the lever 50 at its side edge, and is also suspended into a path along which the engaging portion 48 of the tone arm 44 rotates in the horizontal direction. With this arrangement, when the tone arm 44 rotates in the clockwise direction in FIG. 8 to start playback of the record, the engaging portion of the tone arm is brought into abutment with the suspended end 72 of the spring 70 from the left side as illustrated by solid lines 48 in FIG. 10. In this case, the end 72 of the spring 70 strikes the abutting portion 73 of the lever 50 and cannot be deformed, so that the tone arm 44 is prevented from turning further and the pickup 47 is lowered onto the record at that position. When the pickup 47 is lowered onto the record, the engaging portion of the tone arm 44 locates below the suspended end 72 of the coil spring 70 as illustrated by one dash lines 48A in FIG. 10, so that the tone arm 44 can be turned along the sound groove on the record in the horizontal direction without obstruction. When the tone arm is raised and rotated to return to the original position in a horizontal plane after the playback operation of the record, the engaging portion of the tone arm 44 is bought into abutment with the suspended end 72 of the coil spring 70 from the right side, as illustrated by two dash lines 48B in FIG. 10. In this case, the spring 70 is allowed to be deformed. Thus, the suspended end 72 of the spring 70 is deformed while being urged by the engaging portion of the tone arm 44, and the tone arm is returned to the original position after the engaging portion thereof has passed the suspended end 72. In other words, the suspended end 72 of the coil spring 70 functions similarly to a ratchet in a manner such that it prevents the engaging portion of the tone arm from moving in one direction, while it permits the same to move in the opposite direction. Thus, the invention becomes applicable to the case where the more usual records having the sound groove spiraling from the outer side to the inner side are used.

What is claimed is:

1. A tone arm control mechanism comprising; a drive means; a drive plate reciprocally rotated about an axis by said drive means; a tone arm mounted for horizontal pivotal movement about said axis a non-rotatable auxiliary drive plate mounted parallel to and adjacent said drive plate for vertical reciprocating movement, an arm rest formed on said auxiliary drive plate adapted to engage an intermediate part of said tone arm; an abutting portion formed on said drive plate adapted to engage said intermediate part of said tone arm; cam means including cam portions and slidable contact portions in slidable contact with said cam portions mounted on opposing portions of said drive plate and said auxiliary drive plate; and urging means for pressing said auxiliary drive plate toward said drive plate whereby upon rotation of said drive plate, said cam means cause said auxiliary drive plate to move up or down to raise or lower said tone arm when said intermediate portion of said tone arm engages said arm rest.

2. A mechanism as claimed in claim 1, wherein said tone arm is urged toward said auxiliary drive plate under its own weight.

3. A mechanism as claimed in claim 1, wherein said auxiliary drive plate is urged toward said drive plate under its own weight.

4. A mechanism as claimed in claim 1 wherein said drive means comprises a drive source, a first member rotated by said drive source, a gear means operably coupled to said drive plate, and clutch means operating between said first member and said gear means.

5. A mechanism as claimed in claim 4, said clutch means comprising a solenoid and a rotatable transfer member connected to said solenoid and moveable into power transmitting position between said first member and gear means upon actuation of said solenoid.

6. A mechanism as claimed in claim 4, a drive link eccentrically connected between said gear means and said drive plate for reciprocatingly rotating said plate upon rotation of said gear means.

7. A mechanism as claimed in claim 6, including means for deenergizing said solenoid after a predetermined rotation of said gear means whereby said tone arm is rotated into position and lowered in one said predetermined rotation, and raised and returned to an original position in a following predetermined rotation.

* * * * *